United States Patent
Inoue

(10) Patent No.: US 10,525,972 B2
(45) Date of Patent: Jan. 7, 2020

(54) CONTROL DEVICE FOR HYBRID VEHICLE

(71) Applicant: SUBARU CORPORATION, Tokyo (JP)

(72) Inventor: Yuya Inoue, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 269 days.

(21) Appl. No.: 15/787,591

(22) Filed: Oct. 18, 2017

(65) Prior Publication Data

US 2018/0111604 A1 Apr. 26, 2018

(30) Foreign Application Priority Data

Oct. 25, 2016 (JP) .................. 2016-208851

(51) Int. Cl.
*B60W 20/40* (2016.01)
*B60W 50/02* (2012.01)
(Continued)

(52) U.S. Cl.
CPC .......... *B60W 20/40* (2013.01); *B60K 6/48* (2013.01); *B60W 10/02* (2013.01); *B60W 10/06* (2013.01);
(Continued)

(58) Field of Classification Search
CPC .......... B60K 6/48; B60W 2710/021; B60W 2710/027; B60W 10/02; F16D 2500/7044
See application file for complete search history.

(56) References Cited

U.S. PATENT DOCUMENTS 7,151,987 B2 * 12/2006 Tobler ............... B60K 6/48
701/22
7,178,618 B2 * 2/2007 Komeda ............ B60K 6/105
180/65.275
(Continued)

FOREIGN PATENT DOCUMENTS

JP 2004-175313 A 6/2004
JP 2012-240447 A 12/2012
JP 2014-231320 A 12/2014

OTHER PUBLICATIONS

Japanese Office Action, dated Aug. 21, 2018, in Japanese Application No. 2016-208851 and English Translation thereof.

*Primary Examiner* — Sherry L Estremsky
(74) *Attorney, Agent, or Firm* — McGinn IP Law Group, PLLC

(57) ABSTRACT

Provided is a control device for a hybrid vehicle including a controller that performs a control of the hybrid vehicle including an engine and an electric motor that serve as driving sources, a transmission, and first and second clutches. The first clutch is provided between the engine and the transmission. The second clutch is provided between the transmission and driving wheels. The controller includes first and second control units. The first control unit performs a control, in a motor traveling mode, to bring the first clutch to a disengaged state. The motor traveling mode includes traveling solely with the electric motor being driven. The second control unit performs a control, in the motor traveling mode, to bring the second clutch to a mildly engaged state in which input, from the driving-wheel side, of torque larger than driving torque causes the second clutch to slide.

19 Claims, 2 Drawing Sheets

(51) Int. Cl.

| | | |
|---|---|---|
| *B60W 10/107* | (2012.01) | |
| *B60W 10/06* | (2006.01) | |
| *B60W 10/08* | (2006.01) | |
| *B60K 6/48* | (2007.10) | |
| *F16D 48/02* | (2006.01) | |
| *F16D 25/10* | (2006.01) | |
| *F16D 48/06* | (2006.01) | |
| *B60W 10/02* | (2006.01) | |

(52) U.S. Cl.
CPC .......... *B60W 10/08* (2013.01); *B60W 10/107* (2013.01); *B60W 50/0225* (2013.01); *F16D 25/10* (2013.01); *F16D 25/14* (2013.01); *F16D 48/062* (2013.01); *B60W 2710/021* (2013.01); *B60W 2710/06* (2013.01); *B60W 2710/08* (2013.01); *B60W 2710/10* (2013.01); *B60Y 2200/92* (2013.01); *B60Y 2300/42* (2013.01); *B60Y 2400/72* (2013.01); *F16D 2500/1026* (2013.01); *F16D 2500/10412* (2013.01); *F16D 2500/70406* (2013.01); *Y10S 903/946* (2013.01)

(56) References Cited

U.S. PATENT DOCUMENTS

| | | | | |
|---|---|---|---|---|
| 7,197,383 | B2 * | 3/2007 | Tobler | B60K 6/48 |
| | | | | 701/22 |
| 7,347,802 | B2 * | 3/2008 | Tatara | B60K 6/48 |
| | | | | 477/169 |
| 9,834,193 | B2 * | 12/2017 | Komuro | B60W 10/02 |

* cited by examiner

CONTROL DEVICE FOR HYBRID VEHICLE

CROSS-REFERENCE TO RELATED APPLICATIONS

The present application claims priority from Japanese Patent Application No. 2016-208851 filed on Oct. 25, 2016, the entire contents of which are hereby incorporated by reference.

BACKGROUND

The technology relates to a control device for a hybrid vehicle.

In recent years, hybrid vehicles (HEVs) have been in practical use. Hybrid vehicles include engines and electric motors as driving sources. Some hybrid vehicles include continuously variable transmissions (CVTs) as transmissions, with input clutches provided between the engines and the CVTs, and with output clutches provided between the CVTs and driving wheels. For example, Japanese Unexamined Patent Application Publication (JP-A) No. 2014-231320 discloses a vehicle control device that controls a hybrid vehicle as mentioned above.

In the input clutch, for example, a control of a clutch hydraulic pressure is made, to bring the input clutch to a disengaged state, in order to separate the engine from driving-wheel side, in a motor traveling mode. The motor traveling mode includes traveling solely with the electric motor being driven. In the output clutch, for example, a control of a clutch hydraulic pressure is made, to bring the output clutch to a mildly engaged state, in order to protect the CVT, in a case where a slip or any other incident causes excessive torque to be inputted from the driving wheels. In the mildly engaged state, the excessive torque causes the output clutch to slide. In the CVT, for example, a control of each of pulley hydraulic pressures of a primary pulley and a secondary pulley is made, in order to continuously change a transmission ratio and in order to prevent power transmitting members such as chains from sliding. These controls of the hydraulic pressures include utilizing, for example, solenoid valves, and adjusting the hydraulic pressures by an energization control of the solenoid valves. It is to be noted that normally closed clutches are used, in order to restrain electric power supplied to the solenoid valves or to restrain, for example, heat generation in the solenoid valves. The normally closed clutches are brought to an engaged state during non-energization of the solenoid valves.

SUMMARY

In general, in the control device for the hybrid vehicle as mentioned above, desired is effective prevention of abrupt deceleration of the vehicle. It is desirable to provide a control device for a hybrid vehicle that makes it possible to prevent abrupt deceleration of a vehicle effectively.

An aspect of the technology provides a control device for a hybrid vehicle. The control device includes a controller configured to perform a control of the hybrid vehicle including an engine and an electric motor that serve as driving sources, a transmission, a first clutch, and a second clutch. The first clutch is provided between the engine and the transmission. The second clutch is provided between the transmission and driving wheels. The controller includes a first control unit configured to control the first clutch, and a second control unit configured to control the second clutch. The first control unit is configured to perform a control, in a motor traveling mode, to bring the first clutch to a disengaged state. The motor traveling mode includes traveling solely with the electric motor being driven, out of the engine and the electric motor. The second control unit is configured to perform a control, in the motor traveling mode, to bring the second clutch to a mildly engaged state in which input, from driving-wheel side, of torque larger than driving torque causes the second clutch to slide. The driving torque is transmitted from the transmission.

An aspect of the technology provides a control device for a hybrid vehicle. The control device includes circuitry configured to perform a control of the hybrid vehicle including an engine and an electric motor that serve as driving sources, a transmission, a first clutch, and a second clutch. The first clutch is provided between the engine and the transmission. The second clutch is provided between the transmission and driving wheels. The circuitry includes a first processor configured to control the first clutch, and a second processor configured to control the second clutch. The first processor is configured to perform a control, in a motor traveling mode, to bring the first clutch to a disengaged state. The motor traveling mode includes traveling solely with the electric motor being driven, out of the engine and the electric motor. The second processor is configured to perform a control, in the motor traveling mode, to bring the second clutch to a mildly engaged state in which input, from driving-wheel side, of torque larger than driving torque causes the second clutch to slide. The driving torque is transmitted from the transmission.

DETAILED DESCRIPTION

Figure 1:
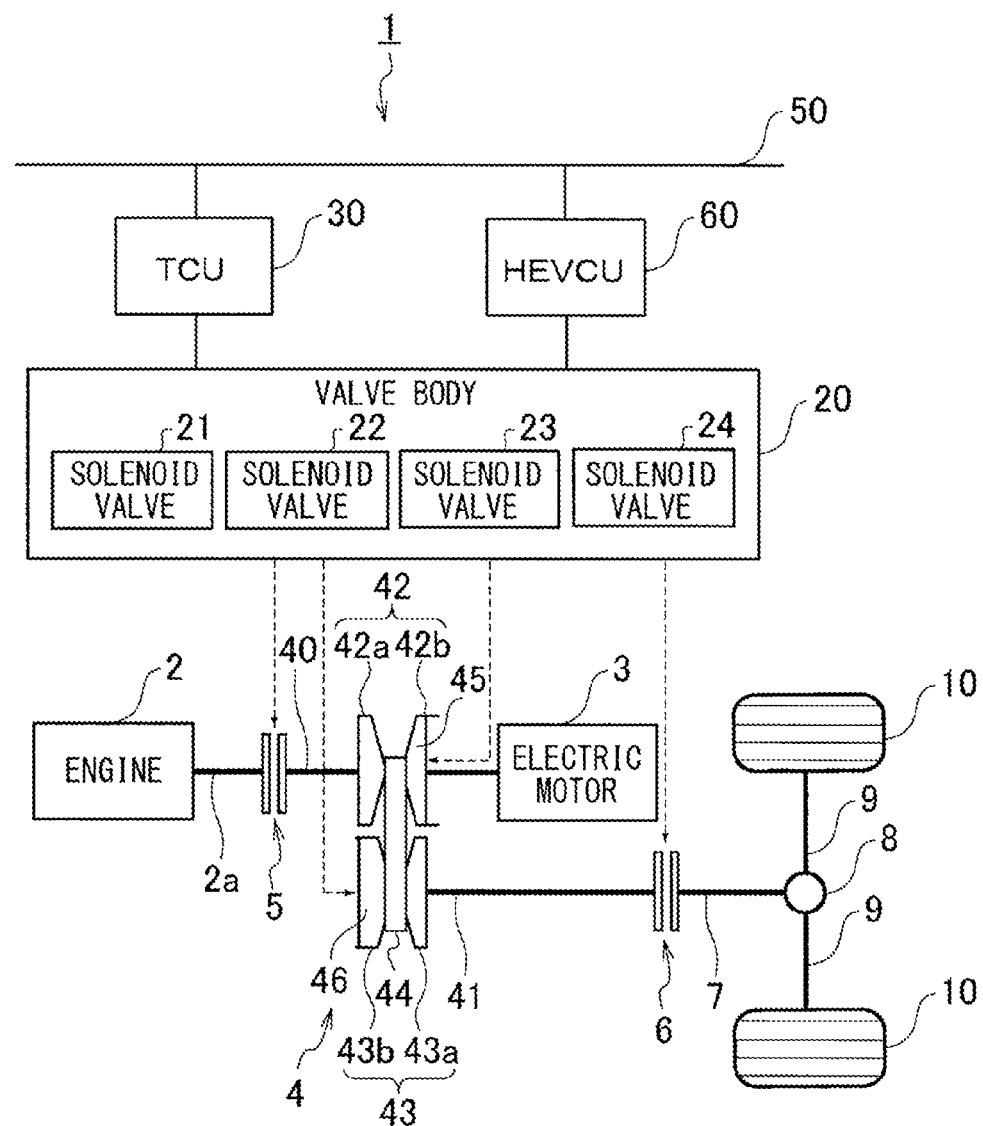
FIG. 1 is a block diagram that illustrates a configuration of a control device for a hybrid vehicle according to one implementation of the technology.

In the following, some implementations of the technology are described in detail with reference to the drawings. It is to be noted that in the figures, the same reference characters are used for the same parts or corresponding parts. In the figures, the same elements are denoted by the same reference characters, and description thereof is omitted to avoid redundancy.

A control device 1 for a hybrid vehicle according to one implementation is described with reference to FIG. 1. FIG. 1 is a block diagram of the control device 1 for the hybrid vehicle according to this implementation. Prior to the description of the control device 1, described is the hybrid vehicle on which the control device 1 is mounted. The hybrid vehicle includes an engine 2 and an electric motor 3 as driving sources, and includes a continuously variable transmission (CVT) 4 as a transmission.

In one implementation of the technology, the CVT 4 may serve as a "continuously variable transmission" and a "transmission".

The engine 2 may be of any type. The engine 2 may be, for example, a horizontally opposed four-cylinder gasoline engine. The electric motor 3 may serve as an electric motor. The electric motor 3 may be, for example, a three-phase alternating-current (AC) synchronous motor. The electric motor 3 may be a motor generator that also serves as a generator. The hybrid vehicle may have, as traveling modes, for example, a motor traveling mode, an engine traveling mode, and a hybrid traveling mode. The motor traveling mode includes traveling solely with the electric motor 3 being driven. The engine traveling mode includes traveling solely with the engine 2 being driven. The hybrid traveling mode includes traveling with the engine 2 and the electric motor 3 being driven.

The CVT 4 may convert a driving force from the engine 2, and output the resultant force. The CVT 4 may include a primary shaft 40 and a secondary shaft 41 disposed in parallel to the primary shaft 40. To one end of the primary shaft 40, for example, a crank shaft $2a$ of the engine 2 may be coupled, through an undepicted torque converter and an input clutch 5. To another end of the primary shaft 40, the electric motor 3 may be coupled. To the secondary shaft 41, a propeller shaft 7 may be coupled, through an output clutch 6. To the propeller shaft 7, driving wheels 10 and 10 may be coupled, through a differential gear 8 and drive shafts 9 and 9.

In one implementation of the technology, the input clutch 5 may serve as a "first clutch". In one implementation of the technology, the output clutch 6 may serve as a "second clutch".

The primary shaft 40 may be provided with a primary pulley 42. The primary pulley 42 may include a fixed pulley $42a$ and a movable pulley $42b$. The fixed pulley $42a$ may be joined to the primary shaft 40. The movable pulley $42b$ may be confronted with the fixed pulley $42a$, and be attached to be able to freely slide in an axial direction of the primary shaft 40 but to be unable to relatively rotate. The primary pulley 42 may be able to change a conical plane interval, i.e., a pulley groove width, between the fixed pulley $42a$ and the movable pulley $42b$.

The secondary shaft 41 may be provided with a secondary pulley 43. The secondary pulley 43 may include a fixed pulley $43a$ and a movable pulley $43b$. The fixed pulley $43a$ may be joined to the secondary shaft 41. The movable pulley $43b$ may be confronted with the fixed pulley $43a$, and be attached to be able to freely slide in an axial direction of the secondary shaft 41 but to be unable to relatively rotate. The secondary pulley 43 may be able to change a pulley groove width between the fixed pulley $43a$ and the movable pulley $43b$.

Between the primary pulley 42 and the secondary pulley 43, extended may be a chain 44 that transmits the driving force. The CVT 4 may change the pulley groove widths of the primary pulley 42 and the secondary pulley 43, to change a ratio of winding diameters of the chain 44 around the pulleys 42 and 43, i.e., a pulley ratio. Thus, the CVT 4 may continuously change a transmission ratio.

The movable pulley $42b$ of the primary pulley 42 may be provided with a primary driving oil chamber 45, or a hydraulic cylinder chamber. The movable pulley $43b$ of the secondary pulley 43 may be provided with a secondary driving oil chamber 46, or a hydraulic cylinder chamber. The primary driving oil chamber 45 may be supplied with, for example, a transmission pressure that changes the pulley ratio. The secondary driving oil chamber 46 may be supplied with a clamp pressure that prevents the chain 44 from sliding. A hydraulic pressure of each of the primary driving oil chamber 45 and the secondary driving oil chamber 46 may be pressure-adjusted by a valve body 20 described later.

Description moves on to the input clutch 5. The input clutch 5 may be provided on a power transmission route from the engine 2 to the CVT 4 on primary-pulley-42 side. To one side of the input clutch 5, the crank shaft $2a$ may be coupled, through the torque converter. To another side of the input clutch 5, the primary shaft 40 may be coupled. The input clutch 5 may be a clutch that separates the engine 2 from driving-wheel-10 side while the engine 2 is stopped during, for example, the motor traveling mode and a regeneration mode. The input clutch 5 may be a clutch incorporated in, for example, a forward-reverse changeover mechanism that changes forward traveling and reverse traveling of the vehicle, i.e., forward rotation and reverse rotation of the driving wheels. The input clutch 5 may be a hydraulic clutch. The input clutch 5 may include an oil chamber, and be able to change torque capacity, i.e., an engagement force, in accordance with a hydraulic pressure supplied to the oil chamber. The oil chamber of the input clutch 5 may be supplied with the hydraulic pressure from the valve body 20 described later. The input clutch 5 may be a normally closed clutch that is brought to an engaged state during non-energization of a solenoid valve 23 described later.

Description is given of the output clutch 6. The output clutch 6 may be provided on a power transmission route from the CVT 4 on secondary-pulley-43 side to the driving wheels 10 and 10. To one side of the output clutch 6, the secondary shaft 41 may be coupled. To another side of the output clutch 6, the propeller shaft 7 may be coupled. The output clutch 6 may be a fuse clutch that protects the CVT 4, or prevents the chain 44 from sliding, in a case where excessive torque is inputted from the driving wheels 10. The excessive torque is inputted from the driving wheels 10, for example, in a case where the driving wheels 10 make a slip, or in a case where the driving wheels 10 come into contact with a wheel stopper at the time of parking. The output clutch 6 may slide, or make a slip, because of the excessive torque from the driving wheels 10, and thereby reduce or alleviate the excessive torque. The output clutch 6 may be a hydraulic clutch, as with the input clutch 5. The output clutch 6 may be a normally closed clutch that is brought to the engaged state during non-energization of a solenoid valve 24 described later.

For example, in a case of the motor traveling mode, the hydraulic pressures of the respective pulleys 42 and 43 of the CVT 4 may be pressure-adjusted to predetermined hydraulic pressures, to bring the input clutch 5 to a disengaged state, and to bring the output clutch 6 to a mildly engaged state. In a case of the engine traveling mode and the hybrid traveling mode, the hydraulic pressures of the respective pulleys 42 and 43 of the CVT 4 may be pressure-adjusted, to bring the input clutch 5 to the engaged state, and to bring the output clutch 6 to the mildly engaged state. In a case where the clutches 5 and 6 are in the disengaged state, no hydraulic pressure may be supplied, to bring the torque capacity to zero (0). In a case where the clutches 5 and 6 are in the engaged state, a maximum hydraulic pressure may be supplied, to bring the torque capacity to a maximum value. In a case where the output clutch 6 is in the mildly engaged state, the hydraulic pressure may be adjusted, to bring the torque capacity to a value that is a minimum necessary to keep the clutch from sliding with driving torque transmitted from the CVT 4, and that allows the clutch to slide in a case where the excessive torque, i.e., torque larger than the driving torque, is inputted from the driving wheels 10. In other words, in the case where the output clutch 6 is in the mildly engaged state, the hydraulic pressure may be adjusted, to bring the torque capacity to a value smaller than that of the engaged state, i.e., the maximum value.

Description now moves on to the control device 1. The control device 1 may perform a control of each of the CVT 4, the input clutch 5, and the output clutch 6. The control device 1 may include the valve body 20, a transmission control unit (TCU) 30, and a hybrid electric vehicle control unit (HEVCU) 60. The TCU 30 and the HEVCU 60 may be able to communicate with each other through, for example, a controller area network (CAN).

In one implementation of the technology, the valve body 20 may serve as a "hydraulic circuit". In one implementation of the technology, the TCU 30 may serve as a "first control unit" or a "first processor". In one implementation of the technology, the HEVCU 60 may serve as a "second control unit" or a "second processor". In one implementation of the technology, the valve body 20, the TCU 30, and the HEVCU 60 may serve as a "controller" or "circuitry".

In one specific but non-limiting example, the control device 1 may have a function of preventing occurrence of abrupt deceleration of the vehicle even if torque is inputted from the driving wheels 10, in a case where an abnormality occurs in any one of the control units, i.e., the TCU 30, the HEVCU 60, or both, in the motor traveling mode in which the engine 2 is in a stopped state. Non-limiting examples of the abnormality in the control units may include a failure in a power supply that supplies electric power to the control units, and an abnormality in a microprocessor or an integrated circuit (IC) for solenoid valve energization that are provided in the control units.

The valve body 20 is described. The valve body 20 may supply the hydraulic pressures to the CVT 4, the input clutch 5, the output clutch 6, and other components. In the valve body 20, a control valve mechanism may be incorporated. The control valve mechanism may open and close a hydraulic path formed inside the valve body 20, with the use of a plurality of spool valves and a solenoid valve. The plurality of the spool valves may be provided in a hydraulic circuit. The solenoid valve may move the spool valves. Thus, the control valve mechanism may generate each of the hydraulic pressures that are obtained by pressure-adjusting a hydraulic pressure, i.e., a line pressure, discharged from an undepicted oil pump.

In one specific but non-limiting example, the valve body 20 may include a solenoid valve 21 for the primary pulley 42 of the CVT 4, a solenoid vale 22 for the secondary pulley 43 of the CVT 4, a solenoid valve 23 for the input clutch 5, and a solenoid valve 24 for the output clutch 6. The solenoid valves 21, 22, 23, and 24 may be coupled to the TCU 30. The solenoid valve 24 may be coupled to the HEVCU 60. As the solenoid valves 21, 22, 23, and 24, for example, linear solenoid valves or duty solenoid valves may be used.

In the valve body 20, the hydraulic pressures may be adjusted in accordance with an energization control of the solenoid valves 21 and 22 by the TCU 30. The hydraulic pressures thus adjusted may be supplied to the respective pulleys 42 and 43, or to the primary driving oil chamber 45 and the secondary driving oil chamber 46. Moreover, in the valve body 20, the hydraulic pressure may be adjusted in accordance with an energization control of the solenoid valve 23 by the TCU 30. The hydraulic pressure thus adjusted may be supplied to the input clutch 5. Furthermore, in the valve body 20, the hydraulic pressure may be adjusted in accordance with an energization control of the solenoid valve 24 by the HEVCU 60. The hydraulic pressure thus adjusted may be supplied to the output clutch 6.

It is to be noted that in a case where the solenoid valves 21 and 22 are in a non-energized state, the hydraulic pressures supplied to the respective pulleys 42 and 43 may be the maximum hydraulic pressure, i.e., the high pressure state. In a case where the solenoid valves 23 and 24 are in a non-energized state, the hydraulic pressures supplied to the respective clutches 5 and 6 may be the maximum hydraulic pressure, i.e., the engage state. As described, with the normally closed clutches, it is possible to restrain electric power to be supplied to the solenoid valves 21, 22, 23, and 24, and to restrain heat generation in the solenoid valves 21, 22, 23, and 24. Moreover, it is possible to allow the vehicle to travel even in a case where the abnormality in the TCU 30 or the HEVCU 60 keeps the solenoid valves 21, 22, 23, and 24 from being energized.

The TCU 30 is described. The TCU 30 may be a control unit that performs a control of a transmission such as the CVT 4 The TCU 30 may include, for example, the microprocessor, a ROM, a RAM, a backup RAM, the IC for the solenoid valve energization, and an input output I/F. The microprocessor may perform calculation. The ROM may store, for example, programs that allow the microprocessor to execute processing. The RAM may store various kinds of data such as calculation results. The backup RAM may store contents stored in the RAM. A power supply that supplies electric power to the TCU 30 may be an undepicted battery for auxiliaries.

For example, the TCU 30 may set the transmission ratio on the basis of a transmission map, obtain a target transmission pressure in order to achieve the transmission ratio, and perform the energization control of the solenoid valve 21 of the valve body 20 in order to achieve the target transmission pressure. Moreover, for example, the TCU 30 may set a target clamp pressure in accordance with the driving torque to be transmitted, and perform the energization control of the solenoid valve 22 of the valve body 20 in order to achieve the target clamp pressure. The target clamp pressure may prevent the chain 44 from sliding. It is to be noted that in a case where the abnormality occurs in the TCU 30, causing a failure in the energization of the solenoid valves 21 and 22, the pulley pressures of the respective pulleys 42 and 43 are brought to the high pressure state, i.e., the maximum hydraulic pressure.

In one specific but non-limiting example, the TCU 30 may perform a main control of the input clutch 5. In other words, the TCU 30 may perform all the control of the input clutch 5 in normal operation. The TCU 30 may perform the energization control of the solenoid valve 23 of the valve body 20, to bring the input clutch 5 to the disengaged state, in a case of the motor traveling mode, i.e., in a case where the engine 2 is in the stopped state. The TCU 30 may suspend the energization of the solenoid valve 23 of the valve body 20, to bring the input clutch 5 to the engaged state, in a case of the engine traveling mode or the hybrid traveling mode, i.e., in a case where the engine 2 is in a driven state. It is to be noted that in a case where the abnormality occurs in the TCU 30, causing a failure in the energization of the solenoid valve 23, the input clutch 5 are brought to the engaged state, i.e., the maximum hydraulic pressure.

Moreover, the TCU 30 may perform a sub-control of the output clutch 6. In other words, the TCU 30 may perform a control of the output clutch 6 solely in a case of the abnormality in the HEVCU 60 that performs a main control of the output clutch 6. The TCU 30 may determine whether or not the abnormality is in the HEVCU 60. In a case where a determination is made on the abnormality in the HEVCU 60, the TCU 30 may perform the energization control of the solenoid valve 24 of the valve body 20, to bring the output clutch 6 to the mildly engaged state, in any traveling mode out of the motor traveling mode, the engine traveling mode, and the hybrid traveling mode.

The TCU 30 may detect the abnormality in the HEVCU 60, for example, by a method as follows. With the use of the CAN 50, the TCU 30 may make the determination on the abnormality in the HEVCU 60 in a case where the TCU 30 fails in getting a normal signal from the HEVCU 60 in response to transmission from the TCU 30, in mutual communication between the TCU 30 and the HEVCU 60 through the CAN 50.

The HEVCU 60 is described. The HEVCU 60 may be a control unit that performs a general control of the hybrid vehicle. The HEVCU 60 may include a microcomputer, a ROM, a RAM, a backup RAM, an IC for the solenoid valve energization, and an input output I/F, as with the TCU 30. A power supply that supplies electric power to the HEVCU 60 may be an undepicted high voltage battery that supplies electric power to the electric motor 3.

For example, the HEVCU 60 may set the traveling mode, e.g., the motor traveling mode, the engine traveling mode, or the hybrid traveling mode, on the basis of operation states of the vehicle and on the basis of a state of charge (SOC) of the high voltage battery. Non-limiting examples of the operation states of the vehicle may include a vehicle speed and a requested driving force. In the motor traveling mode, the HEVCU 60 may obtain solely requested motor torque for the electric motor 3. In the engine traveling mode, the HEVCU 60 may obtain solely requested engine torque for the engine 2. In the hybrid traveling mode, the HEVCU 60 may obtain the requested engine torque for the engine 2, and the requested motor torque for the electric motor 3. The HEVCU 60 may transmit the requested engine torque to an undepicted control unit that controls the engine 2, and transmit the requested motor torque to an undepicted control unit that controls the electric motor 3.

In one specific but non-limiting example, the HEVCU 60 may perform the main control of the output clutch 6. In other words, the HEVCU 60 may perform all the control of the output clutch 6 in normal operation. The HEVCU 60 may perform the energization control of the solenoid valve 24 of the valve body 20, to bring the output clutch 6 to the mildly engaged state, in any traveling mode out of the motor traveling mode, the engine traveling mode, and the hybrid traveling mode. It is to be noted that in a case where the abnormality occurs in the HEVCU 60, causing a failure in the energization of the solenoid valve 24, the output clutch 6 is brought to the engaged state, or the maximum hydraulic pressure.

The HEVCU 60 may also make an abnormality detection of the TCU 30. The HEVCU 60 may detect the abnormality in the TCU 30 in a similar method to the detection method in the TCU 30 as described above. For example, with the use of the CAN 50, the HEVCU 60 may make a determination on the abnormality in the TCU 30 in a case where the HEVCU 60 fails in getting a normal signal from the TCU 30 in response to transmission from the HEVCU 60 in the mutual communication between the TCU 30 and the HEVCU 60 though the CAN 50.

It is to be noted that in a case where the abnormality occurs in any control unit out of the TCU 30 and the HEVCU 60, whichever control unit has no abnormality may perform, as a limp home function, a control to travel with the driving by the engine 2, irrespective of the traveling mode at the time of the occurrence of the abnormality. In this control, for example, the input clutch 5 may be brought to the engaged state, whereas the output clutch 6 may be brought to the mildly engaged state.

Figure 2:
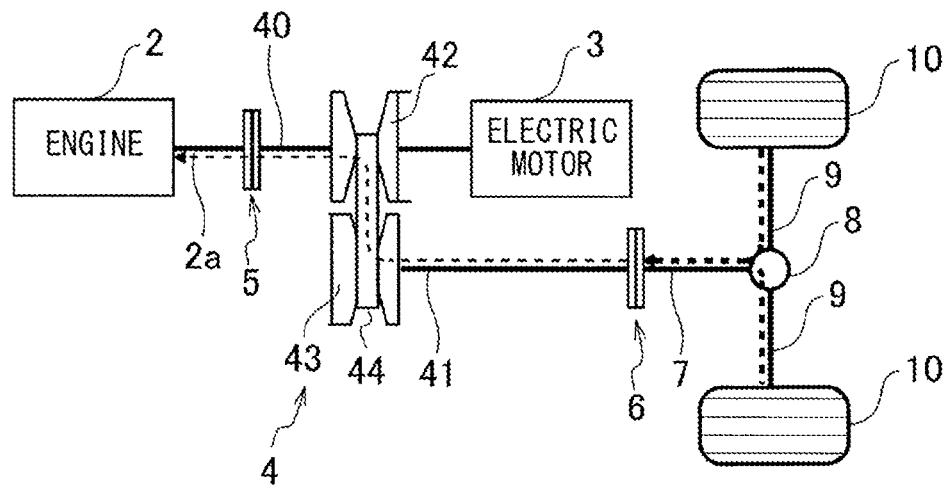
FIG. 2 illustrates a transmission state of torque inputted from driving wheels, in a case with an abnormality in a TCU in a motor traveling mode.

Description is given next, with reference to FIG. 2, of operation with the torque inputted from the driving wheels 10 during travel, in a case where the abnormality occurs in the TCU 30 in the motor traveling mode. The abnormality may involve causing a failure in the energization of at least the solenoid valves 21, 22, and 23. FIG. 2 illustrates a transmission state of the torque inputted from the driving wheels 10 in a case where the abnormality is in the TCU 30 in the motor traveling mode. In FIG. 2, the transmission state of the torque inputted from the driving wheels 10 is indicated by a broken line.

Described first is a case where both the TCU 30 and the HEVCU 60 are normal in the motor traveling mode. In this case, by the energization control of the solenoid valves 21 and 22 by the TCU 30, the pulley pressures of the respective pulleys 42 and 43 of the CVT 4 are pressure-adjusted. Moreover, by the energization control of the solenoid valve 23 by the TCU 30, the input clutch 5 is brought to the disengaged state. Furthermore, by the energization control of the solenoid valve 24 by the HEVCU 60, the output clutch 6 is brought to the mildly engaged state. Thus, the engine 2 is separated from the driving-wheel-10 side, causing the torque generated in the electric motor 3 to be transmitted to the driving wheels 10 through the CVT 4 and the output clutch 6.

Described is a case where the abnormality occurs in the TCU 30. In this case, the TCU 30 fails in energizing the solenoid valves 21, 22, and 23. No currents are supplied to the solenoid valves 21, 22, and 23. Thus, the pulley pressures of the respective pulleys 42 and 43 of the CVT 4 are brought to the maximum hydraulic pressures, i.e., the high pressure state. Moreover, the input clutch 5 is supplied with the maximum hydraulic pressure, and changes from the disengaged state to the engaged state. At this occasion, the output clutch 6 is maintained in the mildly engaged state by the control by the HEVCU 60 that is normal.

At this occasion, with the torque inputted from the driving wheels 10, the output clutch 6, being in the mildly engaged state, slides. Thus, the inputted torque is reduced by the output clutch 6. The torque thus reduced is transmitted to the CVT 4. Furthermore, the torque thus reduced is transmitted to the engine 2 through the CVT 4 in the high pressure state and the input clutch 5 in the engaged state. Accordingly, the engine 2 is supplied with the torque reduced by the output clutch 6. In the engine 2 in the stopped state, the torque causes rotation of the crank shaft 2a, but engine brake becomes smaller, as compared to a case where the torque from the driving wheels 10 is inputted without being reduced. Therefore, a degree of deceleration caused in the vehicle by the engine brake also becomes smaller. This restrains the deceleration caused in the vehicle by the engine brake. It is to be noted that in some cases, the torque is reduced by the output clutch 6 to zero (0), and no torque is transmitted to the engine 2. In this case, no degree of the deceleration by the engine brake is generated.

Figure 3:
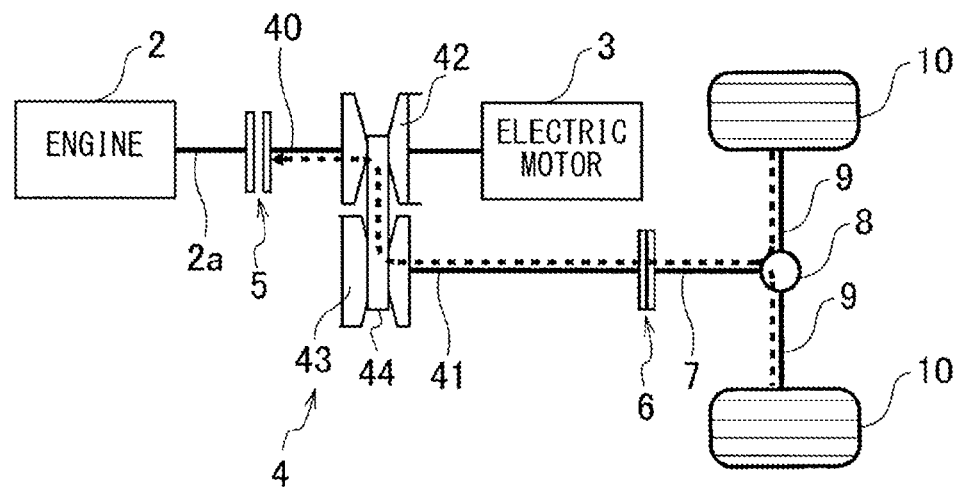
FIG. 3 illustrates a transmission state of the torque inputted from the driving wheels, in a case with an abnormality in an HEVCU in the motor traveling mode.

Description is given next, with reference to FIG. 3, of operation with the torque inputted from the driving wheels 10 during the travel, in a case where the abnormality occurs in the HEVCU 60 in the motor traveling mode. The abnormality may involve causing a failure in the energization of at least the solenoid valve 24. FIG. 3 illustrates a transmission state of the torque inputted from the driving wheels 10 in a case where the abnormality is in the HEVCU 60 in the motor traveling mode. In FIG. 3, the transmission state of the torque inputted from the driving wheels 10 is indicated by a broken line.

In a case where the abnormality occurs in the HEVCU 60, the HEVCU 60 fails in energizing the solenoid valve 24. No current is supplied to the solenoid valve 24. Thus, the output clutch 6 is supplied with the maximum hydraulic pressure, and changes from the mildly engaged state to the engaged state. At this occasion, the pulley pressures of the respective pulleys 42 and 43 of the CVT 4 are pressure-adjusted by the control by the TCU 30 that is normal. Moreover, the input clutch 5 is maintained in the disengaged state.

At this occasion, with the torque inputted from the driving wheels 10, the output clutch 6, being in the engaged state, transmits the torque to the CVT 4. Furthermore, the torque is transmitted to the input clutch 5 through the CVT 4 that is in a pressure-adjusted state. However, the input clutch 5, being in the disengaged state, fails in transmitting the torque to the engine 2. Accordingly, no engine brake is generated in the engine 2.

Thereafter, the TCU 30 may detect the abnormality in the HEVCU 60 with the utilization of the mutual communication via the CAN 50. Upon detecting the abnormality, the TCU 30 may perform the energization control of the solenoid valve 24, to change the output clutch 6 to the mildly engaged state. Thus, the output clutch 6 changes from the engaged state to the mildly engaged state. This causes the output clutch 6 to slide, with the excessive torque being inputted from the driving wheels 10. Accordingly, the excessive torque is reduced by the output clutch 6, and the torque thus reduced is transmitted to the CVT 4. Hence, it is possible to keep the chain 44 of the CVT 4 from sliding.

According to the control device 1 of this implementation, it is possible to prevent the occurrence of the abrupt deceleration of the vehicle, without a high-speed abnormality detection between the TCU 30 and the HEVCU 60, even if the torque is inputted from the driving wheels 10, in a case the abnormality occurs in any one of the TCU 30 and the HEVCU 60 in the motor traveling mode. Time condition of the abnormality detection between the TCU 30 and the HEVCU 60 is considerably relieved, making it possible to simplify the abnormality detection, e.g., the abnormality detection with the utilization of the existing on-vehicle network, i.e., the CAN 50. It is unnecessary to add a high-speed abnormality detector.

According to the control device 1 of this implementation, in a case where the abnormality occurs in the HEVCU 60, upon the TCU 30 detecting the abnormality, the TCU 30 performs a control, to bring the output clutch 6 to the mildly engaged state. Therefore, even if the excessive torque is inputted from the driving wheels 10, the excessive torque is not transmitted to the CVT 4. Hence, it is possible to protect the CVT 4.

According to the control device 1 of this implementation, the TCU 30 and the HEVCU 60 may be supplied with electric power from different batteries or different power supplies. Hence, it is possible to prevent the TCU 30 and the HEVCU 60 from having the abnormalities simultaneously because of a loss of power supply.

Let us give a thought for the following cases as comparative examples 1 and 2. First, in the comparative example 1, unlike the forgoing implementation, the same control unit conducts controls of an input clutch, an output clutch, and a CVT, in controlling a hybrid vehicle. In one example of a hybrid vehicle, the input clutch is provided between an engine and a continuously variable transmission, whereas a fuse clutch or the output clutch is provided between the continuously variable transmission and driving wheels. The input clutch, the fuse clutch or the output clutch, and the continuously variable transmission are controlled by the same control unit. In the control unit, hydraulic pressures or other properties are adjusted by an energization control of each of duty solenoid valves provided in a valve unit.

However, in the case where the single control unit controls the input clutch, the output clutch, and the CVT as in the comparative example 1, occurrence of an abnormality in the control unit causes possibility of, for example, a failure in energization of all the solenoid valves that control the input clutch, the output clutch, and the CVT. For example, in a case with the normally closed input clutch, the failure in the energization of the solenoid valves brings the input clutch to the engaged state.

For example, in the motor traveling mode, if the control unit is normal, the input clutch is the disengaged state, and the output clutch is the mildly engaged state, with the hydraulic pressure of each pulley in the CVT being adjusted to a predetermined hydraulic pressure. If an abnormality should occur in the control unit, the input clutch would change from the disengaged state to the engaged state, and the output clutch would change from the mildly engaged state to the engaged state, with the hydraulic pressure of each pulley in the CVT being brought to a high pressure state, i.e., a maximum hydraulic pressure.

With this state occurring, separation of the engine from the driving-wheel side by the input clutch is cancelled. Accordingly, if torque is inputted from the driving wheels during travel of the vehicle, the torque is transmitted to the engine through the output clutch, the CVT, and the input clutch. The torque thus transmitted causes a crank shaft of the engine in a stopped state to start to rotate, causing generation of the engine brake. Thus, in the comparative example 1, there is possibility that the vehicle is subjected to a significant degree of deceleration, i.e., abrupt deceleration.

Next, in the comparative example 2, as an example of possible countermeasures against the abnormality in the control unit, another control unit may detect the abnormality in the control unit. Upon the separate control unit detecting the abnormality in the control unit, protection processing may be conducted. The protection processing may include, for example, processing that brings the output clutch to the disengaged state.

However, in the comparative example 2, if the abnormality should occur in the control unit, with the input clutch and the output clutch being brought to the engaged state, and with the hydraulic pressure of each pulley being brought to the high pressure state, there would be possibility that the abrupt deceleration occurs in considerably short time, e.g., several hundred milliseconds. In order to suppress the abrupt deceleration, it is necessary to detect the abnormality and to conduct the protection processing in even shorter time than the considerably short time. Thus, the comparative example 2 involves making a high-speed abnormality detection, causing higher possibility of an erroneous detection. Moreover, addition of a high-speed abnormality detector results in an increase in costs.

Although description has been made by giving the implementations as mentioned above, the contents of the technology are not limited to the above-mentioned implementations and may be modified in a variety of ways. For example, in the forgoing implementations, in the control device 1, the TCU 30 may perform the main control of the CVT 4 and the input clutch 5, and perform the sub-control of the output clutch 6. The HEVCU 60 may perform the main control of the output clutch 6. However, in one alternative, the TCU 30 may perform the main control of the CVT 4 and the output clutch 6, and perform the sub-control of the input clutch 5.

The HEVCU 60 may perform the main control of the input clutch 5. In what follows, simple description is given of operation of the control device of this configuration, with the torque inputted from the driving wheels 10, in a case where the abnormality occurs in the TCU 30 or the HEVCU 60 in the motor traveling mode.

Described first is the case where both the TCU 30 and the HEVCU 60 are normal in the motor traveling mode. In this case, by the energization control of the solenoid valves 21 and 22 by the TCU 30, the pulley pressures of the respective pulleys 42 and 43 of the CVT 4 are pressure-adjusted. Moreover, by the energization control of the solenoid valve 24 by the TCU 30, the output clutch 6 is brought to the mildly engaged state. Furthermore, by the energization control of the solenoid valve 23 by the HEVCU 60, the input clutch 5 is brought to the disengaged state.

Described is the case where the abnormality occurs in the TCU 30. The TCU 30 fails in energizing the solenoid valves 21, 22, and 24. Thus, the pulley pressures of the respective pulleys 42 and 43 of the CVT 4 are brought to the high pressure state, bringing the output clutch 6 to the engaged state. Meanwhile, since the HEVCU 60 is normal, the input clutch 5 is maintained in the disengaged state. At this occasion, with the torque inputted from the driving wheels 10, the output clutch 6, being in the engaged state, transmits the inputted torque to the CVT 4. The torque is transmitted to the input clutch 5 through the CVT 4 in the high pressure state. However, the input clutch 5, being in the disengaged state, does not transmit the torque to the engine 2. Accordingly, the engine brake is not generated in the engine 2.

Described next is the case where the abnormality occurs in the HEVCU 60. Since the HEVCU 60 fails in energizing the solenoid valve 23, the input clutch 5 is brought to the engaged state. Meanwhile, because the TCU 30 is normal, the pulley pressures of the respective pulleys 42 and 43 of the CVT 4 are pressure-adjusted, and the output clutch 6 is maintained in the mildly engaged state. At this occasion, with the torque inputted from the driving wheels 10, the output clutch 6, being in the mildly engaged state, slides because of the torque. This causes the output clutch 6 to reduce the torque inputted. The torque thus reduced is transmitted to the CVT 4. The torque thus transmitted is transmitted to the engine 2, through the CVT 4 in the pressure-adjusted state and the input clutch 5 in the engaged state. Thus, the engine 2 is supplied with the torque reduced by the output clutch 6. Hence, it is possible to restrain the deceleration generated in the vehicle.

In the forgoing implementations, a main control unit, i.e., the HEVCU 60, and a sub-control unit, i.e., the TCU 30 may be provided solely for the output clutch 6. However, in one alternative, a main control unit, e.g., the TCU 30, and a sub-control unit, e.g., the HEVCU 60 may be provided for the input clutch 5 as well.

In the forgoing implementations, the TCU 30 may serve as the "first control unit", whereas the HEVCU 60 may serve as the "second control unit". However, other control units than the TCU 30 and the HEVCU 60 may serve as the "first control unit" or the "second control unit".

In the forgoing implementations, the clutches 5 and 6 may be the hydraulic clutches. However, the contents of the technology may be applicable to other clutches such as electromagnetic clutches. For example, in a case with the electromagnetic clutches, in one preferable but non-limiting example, the clutches 5 and 6 may be normally closed clutches that are brought to the engaged state during the non-energization.

In the forgoing implementations, the CVT 4 may serve as the "transmission" and the "continuously variable transmission". However, the contents of the technology may be applicable to other transmissions such as a stepped automatic transmission (AT).

It is possible to achieve at least the following configurations from the above-described implementations of the disclosure.

In a control device for a hybrid vehicle according to an implementation of the technology, a first clutch and a second clutch are controlled by separate control units, i.e., a first control unit and a second control unit of a controller. The first clutch is controlled by the first control unit, whereas the second clutch is controlled by the second control unit. In a motor traveling mode, the first clutch is brought to a disengaged state by a control by the first control unit, whereas the second clutch is brought to a mildly engaged state by a control by the second control unit. At this occasion, in a case where an abnormality occurs in the first control unit, the second clutch is maintained in the mildly engaged state by the control by the second control unit. Accordingly, even if torque is inputted from driving wheels during travel of the vehicle, the second clutch slides to reduce the torque inputted. The torque thus reduced is transmitted to an engine. Moreover, in a case where an abnormality occurs in the second control unit, the first clutch is maintained in the disengaged state by the control by the first control unit. Accordingly, even if torque is inputted from the driving wheels during the travel of the vehicle, the torque is not transmitted to the engine. Hence, according to the control device for the hybrid vehicle of the implementation of the technology, it is possible to restrain abrupt deceleration of the vehicle, without a high-speed abnormality detection of the control unit, with the torque inputted from the driving wheels, in a case where the abnormality occurs in any one of the control units in the motor traveling mode.

In the control device for the hybrid vehicle according to the implementation of the technology, the first control unit may perform a control, to bring the second clutch to the mildly engaged state, in a case where the abnormality occurs in the second control unit in the motor traveling mode. With this configuration, even if the torque inputted from the driving wheels, the second clutch slides. Hence, it is possible to protect the transmission.

In the control device for the hybrid vehicle according to the implementation of the technology, the first clutch and the second clutch may each be a normally closed clutch that is brought to an engaged state during non-energization. With this configuration, in a case where the abnormality occurs in any one of the control units in the motor traveling mode, the relevant control unit fails in energizing the associated clutch, causing the clutch to be brought to the engaged state. However, as described, even if the torque is inputted from the driving wheels, the other of the control units performs a control of the clutch, making it possible to restrain the abrupt deceleration of the vehicle. Moreover, using the normally closed clutches produces effects of restraining power consumption and heat generation.

In the control device for the hybrid vehicle according to the implementation of the technology, the controller may further include a hydraulic circuit that supplies a hydraulic pressure to each of the first clutch and the second clutch. The hydraulic circuit may include a first solenoid valve for the first clutch and a second solenoid valve for the second clutch. The first clutch may be a clutch that is brought to the engaged state during the non-energization of the first solenoid valve. The second clutch may be a clutch that is brought to the engaged state during the non-energization of the second solenoid valve.

In the control device for the hybrid vehicle according to the implementation of the technology, the first clutch and the second clutch may be hydraulic clutches. Each of the clutches may be supplied with a hydraulic pressure by an energization control of each of the solenoid valves by the hydraulic circuit. In one specific but non-limiting example, the first clutch and the second clutch may be normally closed clutches, and be brought to the engaged state during the non-energization of the respective solenoid valves. Accordingly, in a case where the abnormality occurs in the first control unit in the motor traveling mode, the first solenoid valve is brought to a non-energized state, bringing the first clutch to the engaged state. However, the second clutch is maintained in the mildly engaged state by the energization control by the second control unit. Therefore, even if the torque is inputted from the driving wheels, the torque is reduced. Moreover, in a case where the abnormality occurs in the second control unit in the motor traveling mode, the second solenoid valve is brought to the non-energized state, bringing the second clutch to the engaged state. However, the first clutch is maintained in the disengaged state by the energization control by the first control unit. Therefore, even if the torque is inputted from the driving wheels, the torque is not transmitted to the engine. Hence, it is possible to restrain the abrupt deceleration of the vehicle.

In the control device for the hybrid vehicle according to the implementation of the technology, the transmission may be a continuously variable transmission. With this configuration, in a case where the abnormality occurs in any one of the control units in the motor traveling mode, the torque from the driving wheels is transmitted to first-clutch side through the continuously variable transmission. However, as described, it is possible to restrain occurrence of the abrupt deceleration of the vehicle.

In the control device for the hybrid vehicle according to the implementation of the technology, the first control unit may be a unit that controls the transmission, whereas the second control unit may be a unit that controls driving sources of the hybrid vehicle. In the control device for the hybrid vehicle according to the implementation of the technology, the first control unit may be a unit that controls the driving sources of the hybrid vehicle, whereas the second control unit may be a unit that controls the transmission. With these configurations, it is possible to control the first clutch and the second clutch with the separate control units, with the utilization of the existing control units included in the hybrid vehicle.

In one implementation described above, the TCU 30, the HEVCU 60, and the valve body 20 illustrated in FIG. 1 may be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the TCU 30, the HEVCU 60, and the valve body 20. Such a medium may take many forms, including, but not limited to, any type of magnetic medium such as a hard disk, any type of optical medium such as a compact disc (CD) and a digital video disc (DVD), any type of semiconductor memory (i.e., semiconductor circuit) such as a volatile memory and a non-volatile memory. The volatile memory may include a dynamic random access memory (DRAM) and a static random access memory (SRAM), and the non-volatile memory may include a ROM and a non-volatile RAM (NVRAM). The ASIC is an integrated circuit (IC) customized to perform, and the FPGA is an integrated circuit designed to be configured after manufacturing in order to perform, all or a part of the functions of the units illustrated in FIG. 1.

Although some preferred implementations of the technology have been described in the foregoing by way of example with reference to the accompanying drawings, the technology is by no means limited to the implementations described above. The use of the terms first, second, etc. does not denote any order or importance, but rather the terms first, second, etc. are used to distinguish one element from another. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A control device for a hybrid vehicle, the control device comprising
 a controller configured to perform a control of the hybrid vehicle including an engine and an electric motor that serve as driving sources, a transmission, a first clutch, and a second clutch, the first clutch being provided between the engine and the transmission, and the second clutch being provided between the transmission and driving wheels,
 the controller including
  a first control unit configured to control the first clutch, and
  a second control unit configured to control the second clutch,
  the first control unit being configured to perform a control, in a motor traveling mode, to bring the first clutch to a disengaged state, the motor traveling mode including traveling solely with the electric motor being driven, out of the engine and the electric motor, and
  the second control unit being configured to perform a control, in the motor traveling mode, to bring the second clutch to a mildly engaged state in which input, from driving-wheel side, of torque larger than driving torque causes the second clutch to slide, the driving torque being transmitted from the transmission.

2. The control device for the hybrid vehicle according to claim 1, wherein
 the first control unit performs a control, to bring the second clutch to the mildly engaged state, on a condition that an abnormality occurs in the second control unit in the motor traveling mode.

3. The control device for the hybrid vehicle according to claim 2, wherein
 the first clutch and the second clutch are each a normally closed clutch that is brought to an engaged state during non-energization.

4. The control device for the hybrid vehicle according to claim 3, wherein
 the controller further includes a hydraulic circuit configured to supply a hydraulic pressure to each of the first clutch and the second clutch,
 the hydraulic circuit includes a first solenoid valve for the first clutch and a second solenoid valve for the second clutch, the first clutch is a clutch that is brought to the engaged state during non-energization of the first solenoid valve, and the second clutch is a clutch that is brought to the engaged state during non-energization of the second solenoid valve.

5. The control device for the hybrid vehicle according to claim 3, wherein
the transmission is a continuously variable transmission.

6. The control device for the hybrid vehicle according to claim 3, wherein
the first control unit is a unit configured to control the transmission, and
the second control unit is a unit configured to control the driving sources of the hybrid vehicle.

7. The control device for the hybrid vehicle according to claim 3, wherein
the first control unit is a unit being configured to control the driving sources of the hybrid vehicle, and
the second control unit is a unit configured to control the transmission.

8. The control device for the hybrid vehicle according to claim 2, wherein
the transmission is a continuously variable transmission.

9. The control device for the hybrid vehicle according to claim 2, wherein
the first control unit is a unit configured to control the transmission, and
the second control unit is a unit configured to control the driving sources of the hybrid vehicle.

10. The control device for the hybrid vehicle according to claim 2, wherein
the first control unit is a unit being configured to control the driving sources of the hybrid vehicle, and
the second control unit is a unit configured to control the transmission.

11. The control device for the hybrid vehicle according to claim 1, wherein
the first clutch and the second clutch are each a normally closed clutch that is brought to an engaged state during non-energization.

12. The control device for the hybrid vehicle according to claim 11, wherein
the controller further includes a hydraulic circuit configured to supply a hydraulic pressure to each of the first clutch and the second clutch,
the hydraulic circuit includes a first solenoid valve for the first clutch and a second solenoid valve for the second clutch,
the first clutch is a clutch that is brought to the engaged state during non-energization of the first solenoid valve, and
the second clutch is a clutch that is brought to the engaged state during non-energization of the second solenoid valve.

13. The control device for the hybrid vehicle according to claim 11, wherein
the transmission is a continuously variable transmission.

14. The control device for the hybrid vehicle according to claim 11, wherein
the first control unit is a unit configured to control the transmission, and
the second control unit is a unit configured to control the driving sources of the hybrid vehicle.

15. The control device for the hybrid vehicle according to claim 11, wherein
the first control unit is a unit being configured to control the driving sources of the hybrid vehicle, and
the second control unit is a unit configured to control the transmission.

16. The control device for the hybrid vehicle according to claim 1, wherein
the transmission is a continuously variable transmission.

17. The control device for the hybrid vehicle according to claim 1, wherein
the first control unit is a unit configured to control the transmission, and
the second control unit is a unit configured to control the driving sources of the hybrid vehicle.

18. The control device for the hybrid vehicle according to claim 1, wherein
the first control unit is a unit being configured to control the driving sources of the hybrid vehicle, and
the second control unit is a unit configured to control the transmission.

19. A control device for a hybrid vehicle, the control device comprising
circuitry configured to perform a control of the hybrid vehicle including an engine and an electric motor that serve as driving sources, a transmission, a first clutch, and a second clutch, the first clutch being provided between the engine and the transmission, and the second clutch being provided between the transmission and driving wheels,
the circuitry including
a first processor configured to control the first clutch, and
a second processor configured to control the second clutch,
the first processor being configured to perform a control, in a motor traveling mode, to bring the first clutch to a disengaged state, the motor traveling mode including traveling solely with the electric motor being driven, out of the engine and the electric motor, and
the second processor being configured to perform a control, in the motor traveling mode, to bring the second clutch to a mildly engaged state in which input, from driving-wheel side, of torque larger than driving torque causes the second clutch to slide, the driving torque being transmitted from the transmission.

* * * * *